UNITED STATES PATENT OFFICE.

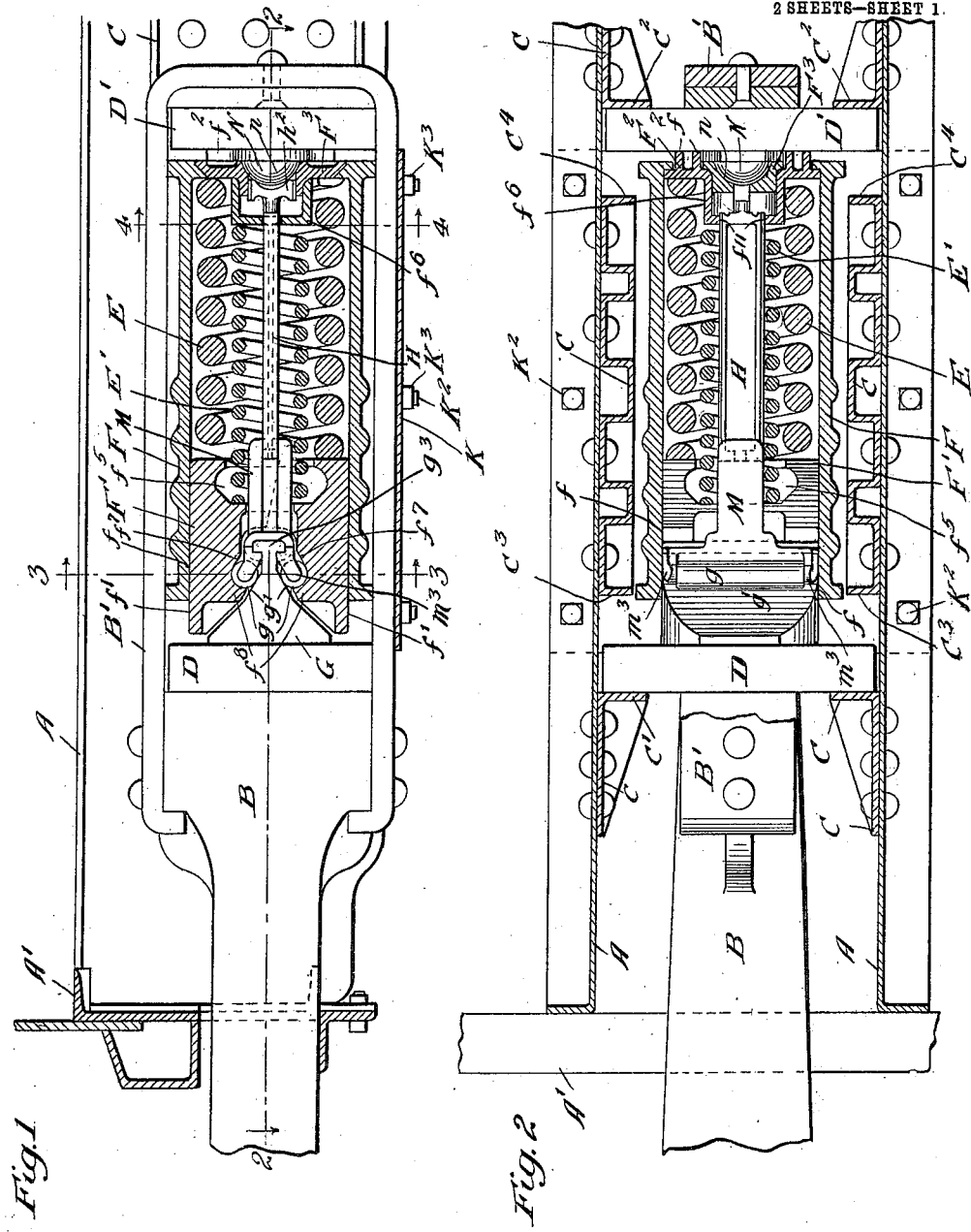

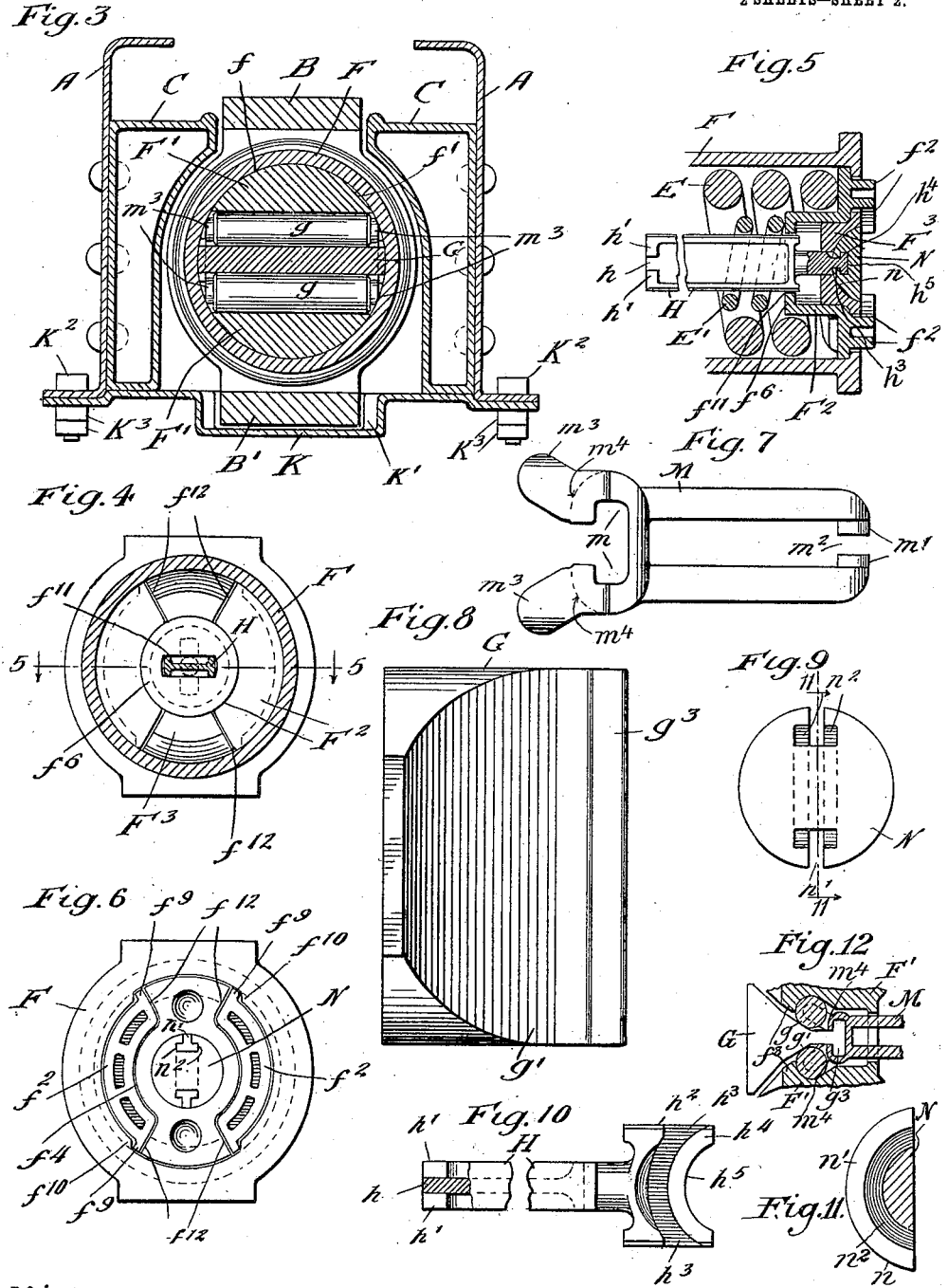

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

FRICTION DRAFT-RIGGING FOR RAILWAY-CARS.

No. 922,618.　　　　　Specification of Letters Patent.　　　　　Patented May 25, 1909.

Application filed January 7, 1909. Serial No. 471,059.

*To all whom it may concern:*

Be it known that I, JOHN F. O'CONNOR, a citizen of the United States, residing in Chicago, in the county of Cook and State of Illinois, have invented a new and useful Improvement in Friction Draft - Rigging for Railway-Cars, of which the following is a specification.

My invention relates to improvements in friction draft rigging for railway cars.

The friction draft rigging of the kind to which my invention relates comprises in connection with the draw-bar, draft yoke, draft lugs and followers, a longitudinally movable friction shell, a cap plate, a preliminary compression follower projecting through the cap plate at one end of the shell, a spring bearing at one end against the preliminary compression follower, friction shoes within the shell bearing at the opposite end against the spring, a wedge between the friction shoes, anti-friction rollers between the friction shoes and wedge, and a connecting bar extending between the cap plate and wedge for holding all the parts in coöperative or assembled relation and the spring under an initial compression. And my present improvement consists in combination with these parts of a separate piece coupling member between the wedge and the connecting bar, provided with projecting wings or arms adapted to engage the ends of the anti-friction rollers and prevent the rollers from slipping longitudinally and engaging and binding or grinding against the inner surface of the friction shell, said coupling member and wedge having interengaging coupling devices, and the connecting bar and coupling member also having interengaging coupling devices. It further consists in connection with these parts in providing the cap with a socket, preferably hemispherical, to receive a coupling key, in combination with a coupling key having a hemispherical face fitting in said socket of the cap, said key and the connecting bar being provided with interengaging coupling devices.

My invention further consists in the novel construction of parts and devices and in the novel combinations of parts and devices herein shown and described.

In the accompanying drawing forming a part of this specification, Figure 1 is a side elevation, partly in central, vertical, longitudinal section of a friction draft rigging embodying my invention. Fig. 2 is a plan view partly in horizontal section on line 2—2 of Fig. 1. Fig. 3 is a cross section on line 3—3 of Fig. 1. Fig. 4 is a detail cross section of the friction shell on line 4—4 of Fig. 1. Fig. 5 is a detail partial longitudinal section on line 5—5 of Fig. 4. Fig. 6 is a detail rear end elevation of the friction shell, cap and preliminary compression follower. Fig. 7 is a detail side elevation of the separate piece roller holding or centering coupling member. Fig. 8 is a detail plan view of the wedge. Fig. 9 is a detail inside elevation of the key and Fig. 10 is a detail plan view of the connecting bar or retainer partly in horizontal section. Fig. 11 is a detail section on line 11—11 of Fig. 9; and Fig. 12 is a detail section on line 12—12 of Fig. 3.

In the drawing, A represents the center sills or draft members of the car to which the draft rigging is applied, $A^1$ the front sill, B the draw-bar, $B^1$ the draw-bar yoke, C the side plates or stop castings having front, rear and intermediate stops $C^1$ $C^2$ $C^3$ $C^4$ for the followers D $D^1$ to abut against.

E $E^1$ are the draft rigging springs, the smaller one being inside the larger, the same bearing at one end against the friction shoes $F^1$ and at the rear end against the preliminary compression follower $F^2$, and through it against the friction shell F. The friction shell F has an internal friction face $f$ in sliding frictional engagement with the external friction faces $f^1$ of the friction shoes or blocks $F^1$. The preliminary compression follower $F^2$ is furnished with bearing lugs $f^2$ which extend through the cap or end plate $F^3$ of the friction shell, preferably about one half inch so as to provide for a preliminary half inch compression of the springs or cushioning action before the friction devices F $F^1$ are forced to slide one in respect to the other. The lugs $f^2$ on the preliminary compression follower extend through suitable holes or openings $f^4$ in the cap or end plate $F^3$ of the friction shell.

The friction shoes or blocks $F^1$ are furnished with a recess or cavity $f^5$ to receive the front end of the inner or smaller spring $E^1$; and the preliminary compression follower $F^2$ is furnished with an inwardly projecting boss $f^6$ which is surrounded by the rear coil of the outer or larger spring E.

G is the wedge and $g$ $g$ anti-friction rollers interposed between the inclined faces $g^1$ of the wedge and the inclined faces $f^7$ of the friction shoes or blocks $F^1$. The coupling member M has at the end thereof connecting with the wedge stop shoulders $m^4$ coöperating with similar stop shoulders $f^8$ on the friction shoes to hold the anti-friction rollers $g$ in place and prevent their getting askew. The wedge G has a coupling device $g^3$, consisting preferably of a T shaped or shouldered extension at the inner end of the wedge adapted to fit within the coupling device or socket $m$ of the separate piece coupling member M by which the wedge is coupled to the connecting bar H which extends longitudinally through the springs and connects the wedge and friction shoes with the cap or end plate $F^3$ of the friction shell F.

The separate piece coupling member M is furnished with a coupling device $m^1$ at its opposite end, preferably consisting of a pair of opposing lugs with a slot $m^2$ between them adapted to receive the web $h$ of the connecting bar, and engage the coupling devices or lugs $h^1$ on the inner end of the connecting bar or retainer H. The detachable separate piece coupling member M is further provided with two pairs of projecting roller centering or holding wings or arms $m^3$, one pair of wings or arms embracing the opposite ends of each of the anti-friction rollers $g$ to prevent said rollers from slipping lengthwise and thus binding or grinding at their ends against the inner surface of the friction shell F.

The connecting member or bar H has at its inner end a head $h^2$ furnished with segmental curved grooves $h^3$ on its upper and lower faces and with a curved coupling flange $h^4$ and a hemispherical socket $h^5$ to receive the ball face $n$ of the hemispherical coupling key N. This coupling key N is furnished on its inner or curved face with a slot $n^1$ and with curved grooves $n^2$ to receive the curved flange $h^4$ of the coupling head $h^2$ of the connecting member or bar H. The key N and coupling head $h^2$ of the connecting bar H are assembled or connected together by first turning these devices at an angle to each other and then swinging the key into a straight line with the axis of the connecting bar H. The coupling member M and wedge G are assembled by moving one of these members transversely of the other. The coupling member M and connecting bar H are assembled by inserting the coupling devices of one of these members into the coupling device of the other while the members are turned at an angle to each other, and then swinging the members into a straight line with each other.

The preliminary compression follower $F^2$ has marginal shoulders $f^9$, which engage shoulders $f^{10}$ at the rear end of the shell and thus prevent this follower from turning in respect to the shell. And it has a slot $f^{11}$ which receives the rear end of the connecting member or bar H so that said bar cannot turn in respect to said follower $F^2$. And the separate piece coupling member M through the connecting bar H prevents the wedge and friction shoes from turning in the friction shell so that the rollers are thus maintained in a horizontal position. The cap or end plate $F^3$ of the friction shell interfits with the preliminary compression follower $F^2$ in a suitable recess or socket $f^{12}$ provided in the rear end of said follower for accommodation of this cap, the cap being thus also held from turning.

K is the carry-iron or plate, the same having a longitudinal channel $K^1$ to receive the lower member of the draft yoke $B^1$ and being removably secured to the center sills or draft members of the car frame by bolts $K^2$ having nuts $K^3$.

The connecting member H and coupling member M serve to hold the springs normally under an initial tension or load, the initial tension or compression thereof being preferably about one half inch, and also serve to hold all the parts assembled and in coöperative relation with each other, the coupling member by its roller centering arms or wings also serving to keep the rollers in position longitudinally and prevent their slipping lengthwise and thus binding and grinding against the inner surface of the friction shell.

The initial tension or compression under which the connecting bar or device holds the springs causes the cushioning mechanism of the draft rigging to remain always of the same proper standard length, notwithstanding the wear that may take place between the friction elements of the cushioning mechanism. The initial tension under which the springs are held should be, as before stated, approximately one half inch, so as to give the draft rigging provision for taking up a large amount of wear between the friction shoes and friction shell without affecting the normal action of the draft rigging. This initial tension under which the connecting device holds the springs also keeps all the parts in snug and proper engagement with each other.

I claim:—

1. In a friction draft rigging, the combination with the draw-bar and followers, of a friction shell, friction shoes and spring within the shell, a wedge, anti-friction rollers between the wedge and friction shoes, a preliminary compression follower, a cap plate for the friction shell, a connecting bar and a separate piece coupling member between the connecting bar and wedge furnished with projecting wings for centering the anti-friction rollers, substantially as specified.

2. In a friction draft rigging, the combination with the draw-bar and followers, of a friction shell, friction shoes and spring within the shell, a wedge, anti-friction rollers between the wedge and friction shoes, a preliminary compression follower, a cap plate for the friction shell, a connecting bar and a separate piece coupling member between the connecting bar and wedge furnished with projecting wings for centering the anti-friction rollers, said wedge and coupling member having interengaging coupling devices for detachably connecting them together, substantially as specified.

3. In a friction draft rigging, the combination with the draw-bar and followers, of a friction shell, friction shoes and spring within the shell, a wedge, anti-friction rollers between the wedge and friction shoes, a preliminary compression follower, a cap plate for the friction shell, a connecting bar and a separate piece coupling member between the connecting bar and wedge furnished with projecting wings for centering the anti-friction rollers, said connecting bar and coupling member having interengaging coupling devices for detachably connecting them, substantially as specified.

4. In a friction draft rigging, the combination with the draw-bar and followers, of a friction shell, a spring and friction shoes within the shell, a wedge, anti-friction rollers and a coupling member connecting with the inner end of the wedge and having projecting arms embracing the ends of the friction roller to center it, substantially as specified.

5. In a friction draft rigging, the combination with the draw-bar and followers, of a friction shell, a spring and friction shoes within the shell, a wedge, anti-friction rollers and a coupling member connecting with the inner end of the wedge and having two pairs of projecting arms, each pair embracing the opposite ends of a friction roller to center the same, substantially as specified.

6. In a friction draft rigging, the combination with the draw-bar and followers, of a friction shell, a spring and friction shoes within the shell, a wedge, a preliminary compression follower interposed between one of the followers and the spring, a cap plate for the friction shell, said cap plate having a hemispherical socket, a connecting bar extending through said cap plate into said socket and a hemispherical key fitting in said socket and engaging said connecting member, substantially as specified.

7. In a friction draft rigging, the combination with the draw-bar and followers, of a friction shell, a spring and friction shoes within the shell, a wedge, a preliminary compression follower interposed between one of the followers and the spring, a cap plate for the friction shell, said cap plate having a hemispherical socket, a connecting bar extending through said cap plate into said socket and a hemispherical key fitting in said socket and engaging said connecting bar, said connecting bar and key having interengaging curved couplings devices, substantially as specified.

8. In a friction draft rigging, the combination with the draw-bar and followers, of a friction shell, a spring and friction shoes within the shell, a wedge, a preliminary compression follower interposed between one of the followers and the spring, a cap plate for the friction shell, said cap plate having a hemispherical socket, a connecting bar extending through said cap plate into said socket and a hemispherical key fitting in said socket and engaging said connecting bar, said connecting bar and key having interengaging curved coupling devices, comprising a curved flange on one of said members and a curved and slotted socket on the other of said members, substantially as specified.

9. In a friction draft rigging, the combination with the draw-bar and followers, of a friction shell, a spring and friction shoe within the shell, a wedge, anti-friction rollers on each side of the wedge, a preliminary compression follower interposed between one of the followers and the spring, a cap plate for the friction shell, a connecting bar, a separate piece coupling member having roller centering arms, and a key, said connecting bar and key having interengaging coupling devices and said cap plate and key having interfitting ball and socket faces, substantially as specified.

10. In a friction draft rigging, the combination with the draw-bar and followers, of a friction shell, a spring and friction shoes within the shell, a wedge, anti-friction rollers on each side of the wedge, a preliminary compression follower interposed between one of the followers and the spring, a cap plate for the friction shell, a connecting bar, a separate piece coupling member having roller centering arms, and a key, said connecting bar and key having interengaging coupling devices, and said cap plate and key having interfitting ball and socket faces, said coupling member and connecting bar having interengaging coupling devices, substantially as specified.

11. In a friction draft rigging, the combination with the draw-bar and followers, of a friction shell, a spring and friction shoes within the shell, a wedge, anti-friction rollers on each side of the wedge, a preliminary compression follower interposed between one of the followers and the spring, a cap plate for the friction shell, a connecting bar, a separate piece coupling member having roller centering arms, and a key, said connecting bar and key having interengaging coupling devices and said cap plate and key having interfitting ball and socket faces, said coupling member and wedge having interengaging coupling devices, substantially as specified.

12. In a friction draft rigging, the combination with the draw-bar and followers, of a friction shell, a spring and friction shoes within the shell, a wedge, anti-friction rollers on each side of the wedge, a preliminary compression follower interposed between one of the followers and the spring, a cap plate for the friction shell, a connecting bar, a separate piece coupling member having roller centering arms, and a key, said connecting bar and key having interengaging coupling devices and said cap plate and key having interfitting ball and socket faces, said coupling member and connecting bar having interengaging coupling devices, and said coupling member and wedge having interengaging coupling devices, substantially as specified.

13. In a draft rigging, the combination with a connecting bar having a head provided with a curved flange, of a cap having a hemispherical socket, and a coupling key having a hemispherical face, and a curved socket to receive the curved flange of the connecting bar, substantially as specified.

14. In a draft rigging, having a spring, coöperating friction members and an anti-friction roller, a coupling member provided with centering arms embracing the ends of the roller, substantially as specified.

15. In a draft rigging, having a spring and coöperating friction members, the combination of a connecting bar with a cap plate, and a coupling key, said cap and key having interfitting ball and socket faces and said cap and key having interengaging coupling devices, substantially as specified.

JOHN F. O'CONNOR.

Witnesses:
H. M. MUNDAY,
ESTHER ABRAMS